United States Patent Office 3,298,866
Patented Jan. 17, 1967

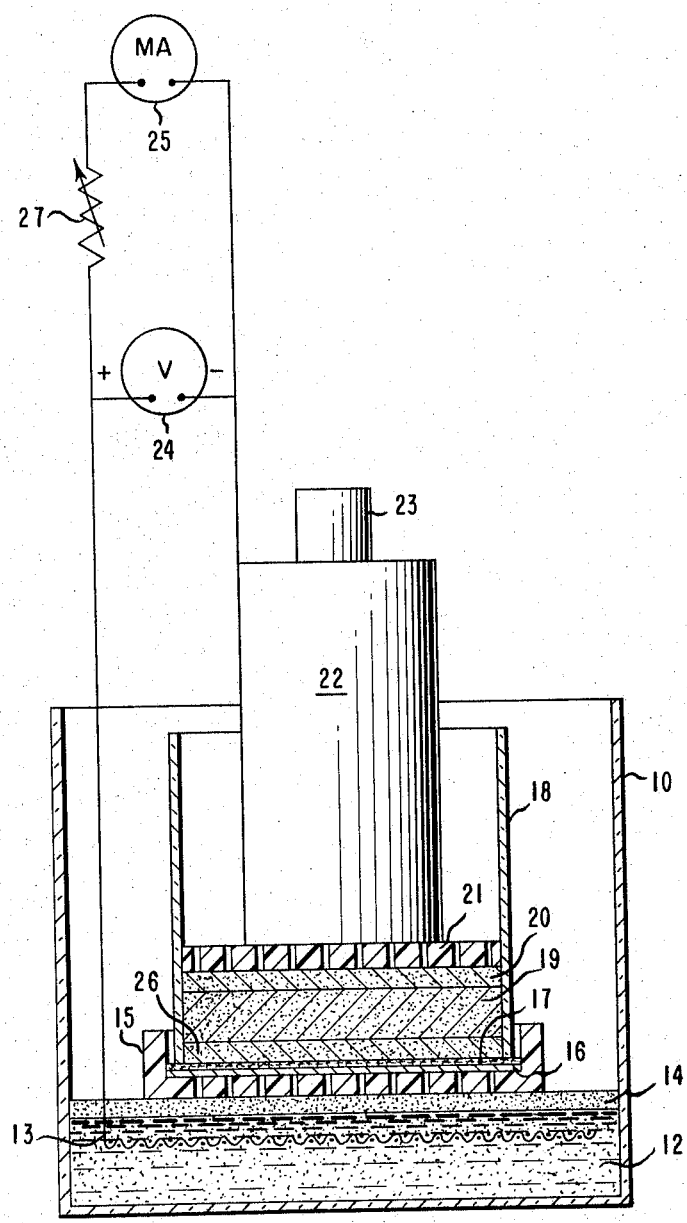

3,298,866
PRIMARY ELECTROCHEMICAL CELL EMPLOYING BORATE ANION AS AN ANODE COMPONENT
Philip E. Lindvig, Wilmington, Del., assignor to E. I. du Pont de Nemours and Company, Wilmington, Del., a corporation of Delaware
Filed July 9, 1962, Ser. No. 208,648
8 Claims. (Cl. 136—83)

This invention relates to, and has as its principal object provision of, primary electrochemical cells employing certain novel anodic components.

The theoretical possibility of the conversion of the chemical energy of many oxidizable compounds, which are also called "fuel materials" in fuel cell technology, directly into electrical energy is well known. The fundamental advantage of such an electrochemical conversioin as compared with the conventionally used thermodynamic conversion is reflected in the relative efficiencies of the two methods. The efficiency of the electrochemical conversion can be increased to nearly 100% by conducting the process in a reversible manner. Comparable efficiencies by thermodynamic conversion using a heat engine may only be obtained by the use of very great temperature differentials which are not practical to obtain. For this reason, the efficiency of the best modern power station using heat engines is only approximately 35%.

In the practical utilization of the electrochemical conversion process, however, considerable difficulty is encountered. Most of the oxidizable materials used in fuel cells and other primary electrochemical cells have low electron capacities. Because of this, metals like sodium, aluminum, and magnesium are able to deliver only a small amount of electrical work per pound of fuel. Other fuels such as coal and hydrocarbons are extremely slow to react at normal temperatures; consequently, in order to avoid polarization in such a cell, it is necessary to operate at considerably increased temperatures, e.g., temperatures of 600° C. and higher. Moreover, carbonaceous materials used as fuels also result in the formation of tar and other unwanted deposits. Still other fuels having high energies such as the light metal hydrides, e.g., lithium hydride, sodium hydride, and sodium borohydride, and diborane can be employed in primary electrochemical cells but they are difficult to handle because of inherent undesirable characteristics such as hygroscopicity, pyrophoricity, toxicity, corrosiveness, volatility, and the like.

Improved electrochemical cells employing as the fuel material compounds which do not possess the abovementioned disadvantages are provided by the present invention. The primary electrochemical cells of this invention contain, as an essential anodic component, polyhydropolyborate anions. These anions are provided by certain polyhydropolyboric acid compounds. Polyhydropolyborate anions having at least 10 boron atoms are especially preferred as the anodic component, or fuel, in the electrochemical cells of this invention. Polyhydropolyboric acid compounds that are operable in the invention include decahydrodecaborates ($B_{10}H_{10}^=$), tetradecahydroundecaborates ($B_{11}H_{14}^-$), tridecahydroundecaborates ($B_{11}H_{13}^=$), dodecahydrododecaborates ($B_{12}H_{12}^=$) and divalent and tetravalent octadecahydroeicosaborates ($B_{20}H_{18}^=$ and $B_{20}H_{18}^{-4}$) in the form of the free acids or in the form of salts having cations having respective valences of 1–3, inclusive. Specific salts of these anions that are useful include the sodium, potassium, lithium, calcium, barium, ammonium, tetramethylammonium, and pyridinium decahydrodecaborates, tetradecahydroundecaborates, tridecahydroundecaborates, dodecahydrododecaborates and octadecahydroeicosaborates.

The polyhydropolyborate anions used in this invention are capable of releasing a large number of electrons upon oxidation at the anode of a primary electrochemical cell. This is illustrated by the following equations showing the net electrochemical reaction of representative polyhydropolyborate anions in primary cells:

$$B_{10}H_{10}^= + 30H_2O \rightarrow 10H_3BO_3 + 40H^+ + 42e^-$$
$$B_{12}H_{12}^= + 36H_2O \rightarrow 12H_3BO_3 + 48H^+ + 50e^-$$

When the above reactions are carried out under alkaline conditions, e.g., in aqueous potassium hydroxide, $K_3BO_3$ is obtained instead of the free boric acid. The high yield of electrons which the polyhydropolyborate anions are capable of releasing makes these particular anions of great value as fuels in primary electrochemical cells.

In addition to the high electron yield from these polyhydropolyborate anions, these anodic components possess other properties that make them especially valuable as fuels in primary electrochemical cells. Thus, they are nontoxic, noninflammable, and nonvolatile, and are water-soluble. The salts are also insensitive to acidic and basic agents and are in general easily handled and controlled.

Although the polyhydropolyborate anions are stable, as indicated above, their high energy is released in primary electrochemical cells by contacting the polyhydropolyborate anions with a catalyst comprising a metal of Group VIII of the Periodic Table having an atomic number between 28 and 78, inclusive, i.e., nickel, ruthenium, rhodium, palladium, osmium, iridium or platinum, or a compound of such a metal that is reduced to the metal under the raction conditions. Specific catalysts that are operable include platinum black, palladium black, nickel, platinum dioxide, chloroplatinic acid, palladium oxide, rhodium sesquioxide, rhodium chloride, ruthenium-on-charcoal, palladium-on-barium sulfate, and palladium-on-carbon. Catalysts useful in the primary electrochemical cells of this invention are those effective in causing the hydrolysis of polyhydropolyboric acid compounds as described in U.S. Patent 3,166,514. These catalysts can be used in amounts ranging from 0.01% of the weight of polyhydropolyborate to amounts of 100% or more. Amounts ranging from 1% to 10% of the weight of polyhydropolyborates are preferred. By virtue of the stability mentioned above, a primary electrochemical cell having a long shelf life can be made by keeping the polyhydropolyborate fuel out of contact with the catalyst until electrical energy is needed. This can be accomplished, for example, by charging the cell with dry ingredients and then adding water when electrical energy is needed.

The invention is described in further detail in the accompanying drawing wherein is shown a vertical section through the center of a cell constructed from a cylindrical glass container. This cell is assembled as follows: A ¼" layer of cathode mixture 12 (manganese dioxide wet with 4 M aqueous potassium hydroxide) is placed on the bottom of glass container 10. A platinum screen electrode 13 is embedded in the cathode mixture and a ⅛" layer of graphite paste 14 (powered graphite wet with 4 M aqueous potassium hydroxide) is placed on top of the cathode mixture. On top of this graphite paste is placed a perforated disc of a commercial phenolformaldehyde resin used as separator plate 15. A layer of filter paper 16 and a layer of cotton gauze 17 are fitted into the disc and held in place with a glass sleeve 18. A ⅛" layer 26 of graphite paste (graphite wet with 4 M aqueous potassium hydroxide) is spread on the gauze covered disc inside the glass sleeve, and an anode mixture 19 consisting of 0.25 g. of sodium dodecahydrododecaborate dihydrate mixed with 10 mg. of platinum black (catalyst) is placed on the graphite paste. This anode mixture is covered with another ⅛" layer of graphite paste 20 in order to make a good contact with a perforated graphite disc 21 and a graphite rod 22. A 1 kg. weight 23 is placed on the graphite rod in order to provide good contact between the various sections of the cell. A high impedance voltmeter 24, a milliammeter 25, and a variable load resistance 27 are connected to the cell in order to determine the discharge characteristics.

*Example I*

The cell described above and in the figure develops an electric current of 24 milliamperes at about 0.6 volt which drops to about 6 milliamperes at 0.1 volt after ¾ hour at room temperature.

*Example II*

In another cell of the type described above using sodium dodecahydrododecaborate as the fuel and a solution of 62 g. of ammonium chloride in 250 ml. of water as the electrolyte generates an electric current of about 60 milliamperes at 0.6 volt. After 30 hours the current is 6 milliamperes at 0.1 volt.

*Example III*

A primary cell similar to that of Example II is prepared with the single exception that the polyhydropolyborate fuel is ammonium decahydrodecaborate. This cell develops an electric current of about 70 milliamperes at about 0.6 volt which decreases to 14 milliamperes at 0.1 volt after 18 hours.

The examples have illustrated the primary electrochemical cells of this invention by reference to the specific cell shown in the figure employing specific fuels, anodes, cathodes and electrolytes. However, this invention is not limited to these specific embodiments. In addition to the specific electrolytes mentioned in the examples any aqueous solutions of any alkali metal hydroxide or water soluble ammonium or metal salt can be employed as electrolytes. Specific examples of other electrolytes that are operable include aqueous solutions of lithium hydroxide, sodium hydroxide, sodium sulfate, ammonium sulfate, potassium chloride, potassium bromide, lithium perchlorate, and the like.

The examples have illustrated the use of manganese dioxide as a cathode material. In the electrochemical reactions taking place at the cathode the manganese dioxide is reduced, the nature of reduction being dependent on the pH of the electrolyte being employed. In an acidic system the reduction is illustrated by the equation:

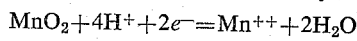

In a basic system the following reduction takes place:

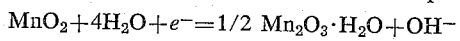

However, the use of polyhydropolyborate anions as the essential anodic component in primary electrochemical cells does not require the use of manganese dioxide as a cathode material. Other oxidizing agents are also operable, e.g., ceric hydroxide or oxygen. When oxygen is used as the oxidizing agent a catalyst such as silver is also ordinarily employed.

The cathode can be constructed of any material that is electrically conducting and relatively inert to the electrolyte and fuel. Cathodes of conventional types are operable. In addition to the platinum screen cathode illustrated in the examples, there can be used electrodes, both solid and hollow, porous electrodes, made of carbon, nickel, nickel alloys, etc. Hollow, porous electrodes are especially convenient when gaseous oxygen is being used as oxidizing agent.

Similarly, in addition to the graphite anode, or fuel electrode, described in the examples other inert anodes can be used. For example, the anodes can be constructed of steel, nickel or nickel alloys and they can be either solid or porous.

The polyhydropolyboric acid compounds used as fuels in the primary electrochemical cells of this invention can be made by various methods. For example, the alkali or alkaline earth metal dodecahydrodecaborates can be prepared by the reaction of an alkali metal or alkaline earth metal hydroborate (alternatively called borohydride), e.g., sodium borohydride, with diborane, $B_2H_6$. This reaction is conveniently carried out by maintaining the reactants in contact under superatmospheric pressure in the substantial absence of moisture at an elevated temperature, preferably above 100° C. This process is described in greater detail in U.S. Patent 3,169,045. Salts other than alkali metal or alkaline earth metal dodecahydrododecaborates can be made from the particular alkali or alkaline earth metal salts by simple metathetic reaction with other salts to effect an exchange or cations. Thus, sodium dodecahydrododecaborate undergoes reaction with ammoniumsulfate, pyridinum chloride, morpholinium sulfate or silver nitrate in aqueous or nonaqueous solution (e.g., methanol) to form dodecahydrododecaborates having as cations ammonium, pyridinium, morpholinium and silver. This process is also described in greater detail in the aforementioned U.S. Patent 3,169,045.

The free dodecahydrododecaboric acid, $H_2B_{12}H_{12}$, can be prepared by contacting an aqueous solution of an alkali metal or alkaline earth metal salt of the dodecahydrododecaborate anion with a strongly acidic cation exchange resin. To illustrate, an aqueous solution of disodium dodecahydrododecaborate is passed through a column packed with "Amberlite" IR–120–H, a strongly acidic resin of the sulfonic acid variety. The eluent, which contains the acid $H_2B_{12}H_{12}$, is evaporated under reduced pressure to obtain the hydrated acid in the form of a white crystalline solid.

The salts of the decahydrodecaborate anions used in the electrochemical cells of this invention can be prepared by the following series of steps. A decaboryl bis(dialkyl sulfide) is prepared by reaction of one mole of decaborane with two moles of a dialkyl sulfide, e.g., dimethyl sulfide, at a temperature between 0° and 100° C. until approximately one mole of hydrogen is evolved. This preparation is described in U.S. Patent 3,154,561. One mole of a decaboryl bis(dialkyl sulfide), e.g., decaboryl bis(dimethyl sulfide), is contacted with two moles of a primary, secondary, or tertiary alkyl amine or of ammonia at a temperature between −50 and 100° C. to form an amine salt of the $B_{10}H_{10}^=$ anion. The preparation of such amine salts is described in greater detail in U.S. Patents 3,148,938 and 3,149,163.

An aqueous solution of the decahydrodecaborate amine salt prepared as described above, is contacted with a strongly acidic cation exchange resin to form the free acid $H_2^{++}B_{10}H_{10}^=\cdot(H_2O)_m$. A suitable acidic cation exchange resin for use in this process is one which comprises a copolymer base of a styrene polymer crosslinked with a divinylbenzene which base is sulfonated to introduce sulfonic acid groups into the aryl nucleus as the polar groups. The reaction of the decahydrodecaborate amine salt with the cation exchange resin is conveniently accomplished by passing an aqueous solution of the amine salt through the ion exchange resin, or alternatively, by stirring the ion exchange resin in an aqueous solution of the amine salt. The ion exchange reaction can be carried out at any temperature between the freezing point and boiling point of water.

The metal salts of $B_{10}H_{10}^=$ can be prepared from the free acid $H_2^{++}B_{10}H_{10}^=\cdot(H_2O)_m$, by various methods. In one method the free acid is neutralized to a pH of at least 7 in aqueous solution with an aqueous dispersion (i.e., a solution or suspension) of an inorganic base containing the desired metal, e.g., an alkali or alkaline earth metal hydroxide. The resulting aqueous solution of the metal salt of the $B_{10}H_{10}^=$ anion can then be concentrated by evaporation of water until the salt crystallizes out.

Another way of preparing the metal salts of the

anion is to add a solution of the boron hydride acid, $H_2^{++}B_{10}H_{10}^{=}$, or of a soluble salt of this acid, e.g., the ammonium or sodium salt, to a solution of a soluble salt of that metal whose $B_{10}H_{10}$ salt is desired under such conditions, e.g., particular solvent employed, that the desired $B_{10}H_{10}^{=}$ metal salt precipitates from the reaction solution as a result of a metathetic reaction. These methods are described in greater detail in U.S. Patent 3,148,939.

Aqueous solutions of decahydrodecaboric acid $$(H_2^{++}B_{10}H_{10}^{--}$$

or the hydronium form $(H_3O)_2^{++}B_{10}H_{10}^{--})$ are prepared by contacting an aqueous solution of a salt of decahydrodecaboric acid (e.g., an anionic salt prepared as described above) with a strongly acidic cation exchange resin, for example, a cation exchange resin of the sulfonic acid variety such as those commercially available as "Amberlite" IR-120-H and Dowex 50. This process is described in greater detail in the above-mentioned U.S. Patent 3,148,939.

The tetradecahydroundecaborate salts can be prepared by reaction of decaborane with an alkali or alkaline earth metal borohydride in solution in an ether, e.g., diethyleneglycol dimethyl ether, at a temperature above 25° C., preferably at 65-100° C. The substituted ammonium and heavy metal salts of the tetradecahydroundecaborates can be prepared by metathesis from the alkali metal salts. The preparation of these $B_{11}H_{14}^-$ salts is described in greater detail in U.S. application Serial No. 20,835, filed April 8, 1960, by V. D. Aftandilian, now abandoned but refiled as Serial No. 245,463 on December 18, 1962.

Salts of the $B_{11}H_{13}^{-2}$ anion can be prepared by treatment of an alkali metal salt of the $B_{11}H_{14}^-$ anion prepared as described above, with a strong base. Thus, an aqueous solution of sodium tetradecahydroundecaborate (−1) can be mixed with a molar solution of zinc chloride in 10 molar aqueous ammonium hydroxide to give a white solid precipitate. This product, which is tetraammine zinc tridecahydroundecaborate, can be purified by crystallization from dilute ammonium hydroxide and has the formula $[Zn(NH_3)_4]^{+2}B_{11}H_{13}^{-2}$. This process is described in U.S. application Serial No. 38,099, filed June 23, 1960, by H. C. Miller and E. L. Muetterties, now abandoned but refiled as Serial No. 421,697 on December 28, 1964.

Compounds having the $B_{20}H_{18}^{-2}$ anion can be prepared by oxidation of compounds having the $B_{10}H_{10}^{-2}$ anion. Oxidation can be accomplished either chemically or electrolytically. In chemical oxidation the oxidizing agent, or oxidant, is a compound having as a characteristic component a metal of variable valence, which metal is in its highest valence state, said compound having an oxidation-reduction potential in acid solution of about −1.33 to about −1.61 volts. The oxidation is conveniently carried out by adding the oxidant, e.g., a dichromate, a higher oxide of lead, a permanganate, a higher oxide of bismuth or a salt of tetravalent cerium to a solution of the $B_{10}H_{10}^{-2}$ compound in a solvent, e.g., water, methanol, and the like, at temperatures between 0° and 100° C., preferably between 10° and 75° C. The reaction is continued until evolution hydrogen ceases. A solution containing a desired cation is added to the resulting reaction mixture whereupon the corresponding salt of the $B_{20}H_{18}^{-2}$ anion may precipitate. If precipitation does not occur, the solution can be evaporated to a volume at which the salt separates.

In the electrolytic oxidation process, the decahydrodecaborate (2−) salt is dissolved in a liquid solvent which has no tendency to release or accept protons, e.g., nitriles, quaternary nitrogen bases, and the like. An electric current is then passed through the solution. A current of at least 1 ampere and at least 1 volt is usually satisfactory, and the process is carried out at atmospheric or higher temperature until the evolution of hydrogen ceases. The salt may be isolated in the manner described above. Methods for the preparation of $B_{20}H_{18}^{-2}$ compounds are described in greater detail in U.S. application Serial No. 199,573, filed by E. L. Muetterties on May 31, 1962.

Salts of the $B_{20}H_{18}^{-4}$ anion are readily prepared by reaction of salts of the $B_{20}H_{18}^{-2}$ anion with strong bases. The reaction is conveniently carried out in water to which water-miscible organic solvents can be added, if desired, to increase solubility. The salt of the $B_{20}H_{18}^{-2}$ anion and the strong base are dissolved and heated with stirring until the solution is colorless. Any salt of the $B_{20}H_{18}^{-2}$ anion can be used but as a matter of convenience the alkali metal, alkaline earth metal or substituted ammonium salts are preferred. Strong bases that are useful in this process are those which are equivalent in strength to an alkali metal hydroxide. Examples include alkali metal hydroxides, alkaline earth metal hydroxides and aralkyl or lower alkyl quaternary ammonium hydroxides. Sufficient base is used to maintain the reaction mixture alkaline. The reaction proceeds at normal atmospheric temperature but it is preferred to heat the mixture, e.g., to its boiling point, to increase the rate of the reaction. The resulting solution can then be reacted with an aqueous solution of a salt containing the cation that is desired in the final product. The $B_{20}H_{18}^{-4}$ salt may precipitate and be separated at this point or the solution can be evaporated to a volume where separation of the salt of the tetravalent anion occurs. This process is described in greater detail in U.S. application Serial No. 199,571, filed May 31, 1962, by E. L. Muetterties and now abandoned but refiled October 9, 1963, as U.S. application Serial No. 315,084.

The polyhydropolyborate anion anodic component, or fuel, of the electrochemical cells of this invention is useful in other types of electrochemical cells than the specific one described above. Using porous conducting electrodes, a solution of the polyhydropolyborate anion can be introduced continuously as a liquid fuel which is oxidized by a continuously introduced oxidizing agent and then subsequently removed as spent fuel. This type of primary electrochemical cell, which is commonly known as a fuel cell, can also utilize various types of cathodes. For example, an oxygen electrode can be used to provide OH− ions by the reduction of oxygen in a basic aqueous system. The resulting hydroxyl ions then transport the electrical charge to the anode where the polyhydropolyborate anions are oxidized.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a primary electrochemical cell, the improvement in combination therewith comprising the active anode component consisting essentially of:
   (1) a material selected from the group consisting of acids and salts with cations having a valence between 1 and 3, inclusive, of at least one ion of the group consisting of decahydrodecaborate, tetradecahydrodecaborate, tridecahydroundecaborate, dodecahydrododecaborate and di- and tetravalent octadecahydroeicosaborate ions; and
   (2) at least one catalyst selected from the group consisting of the metals nickel, ruthenium, rhodium, palladium, osmium, iridium and platinum and compounds of these metals.

2. The cell of claim 1 employing an alkali metal decahydrodecaborate as the salt of the active anode component.

3. The cell of claim 1 employing an alkali metal tetradecahydroundecaborate as the salt of the active anode component.

4. The cell of claim 1 employing an alkali metal tridecahydroundecaborate as the salt of the active anode component.

5. The cell of claim 1 employing an alkali metal dodecahydrododecaborate as the salt of the active anode component.

6. The cell of claim 1 employing an alkali metal octadecahydroeicosaborate as the salt of the active anode component.

7. In a primary electrochemical cell of claim 1, the improvement in combination therewith comprising the active anode component consisting essentially of an alkali metal dodecahydrododecaborate mixed with metallic platinum.

8. In a primary electrochemical cell of claim 1, the improvement in combination therewith comprising the active anode component consisting essentially of ammonium decahydrodecaborate mixed with metallic platinum.

References Cited by the Examiner

UNITED STATES PATENTS

| | | | |
|---|---|---|---|
| 2,901,524 | 8/1959 | Gorin et al. | 136—86 |
| 2,928,891 | 3/1960 | Justi et al. | 136—86 |
| 3,025,334 | 3/1962 | Vinal | 136—86 |
| 3,073,884 | 1/1963 | Pinkerton | 136—100 |
| 3,077,507 | 2/1963 | Kordesch | 136—86 |
| 3,183,124 | 5/1965 | Jasinski | 136—120 X |

WINSTON A. DOUGLAS, *Primary Examiner.*

MURRAY TILLMAN, ALLEN B. CURTIS, *Examiners.*

B. J. OHLENDORF, *Assistant Examiner.*